Patented July 21, 1953

2,646,454

UNITED STATES PATENT OFFICE 2,646,454

PROCESS FOR THE MANUFACTURE OF BATTERY ELECTRODES AND THE RESULTING ELECTRODES

Victor Herold, Paris, France, assignor to Societe des Accumulateurs Fixes & de Traction, Romainville, France, a French body corporate No Drawing. Application August 31, 1950, Serial No. 182,635. In France February 28, 1950

9 Claims. (Cl. 136—24)

This invention relates to method of manufacturing electrodes for alkaline storage batteries and to the resulting electrodes. The invention is particularly useful in respect of the negative electrode of such batteries.

It has been proposed to form storage battery electrodes by sintering finely divided electrolytically active iron powder molded in desired form and to modify the action of such electrodes by depositing thereon compounds of other metals in order that the latter will be associated with iron hydroxide in the completely processed electrode. However, such electrodes lose capacity and disintegrate by reason of the activity of the material of which they are constituted.

Objects of the present invention are to provide a process of producing an electrode having long life at high capacity, and to provide such an electrode.

In the practice of the present invention an electro-conductive but electrolytically inactive support is highly impregnated with iron in an electrolytically active form to provide an electrode of high permanent capacity including an inactive support; but iron included in the support may be active or partially active.

In the practice of this invention there may be included in the electrode cadmium in electrolytically active form in addition to said iron and it is a feature of this invention that mercury or titanium or both, in suitable form, may be also included with said iron or said iron and cadmium, titanium or mercury or both being included with both iron and cadmium, and titanium being included when either iron or cadmium are present.

The practice of this invention in its best form with the maximum of advantages in the manufacturing operations whereby the electrode is produced and in the resulting electrode involves the utilization of a support consisting of a porous electro-conductive body produced by sintering of electrolytically inactive iron powder, nickel powder, or a mixture of said powders; the simultaneous impregnation of the support with water soluble salts having the same acid radical of iron, cadmium, and mercury or titanium, in aqueous solution; the treatment of the impregnated support at 60° C. to 80° C. with an aqueous solution of an alkali metal hydroxide, such as caustic soda or caustic potash, and, simultaneously or subsequently, with cathodic electrical treatment; the washing of the support so treated; the drying of the washed support; and the repetition of the impregnating, precipitating, cathodic treatment, washing and drying steps until the support carries a substantial proportion of active material.

A simultaneous deposit is caused within the pores of the inactive electrode support of all of the constituent elements of the material to be deposited in the pores of the electrodes when, according to the present invention, the metal salt impregnation bath contains at least a ternary mixture of three salts, namely, an iron salt, a cadmium salt, and a mercury or titanium salt. Thus, a perfect mixing of the constituents of the deposit is obtained, which considerably increases the duration of capacity preservation of the electrodes thus prepared. In practice, this capacity is found to be very close to that which can be determined theoretically by considering the weight of active material deposited and such capacity is preserved during the life of the storage battery.

However, the sequence of operations referred to above as the best practice of my invention is subject to numerous variations which produce valuable results but may not achieve to the highest degree the advantages of this invention. Thus, the support may be other porous material than sintered metal powder, such for example as powder or other fine particles of metal or conductive material carried in a grid or container; and when the support is made by sintering, the iron powder included in the sintered metal powder may be active or partially active. Instead of impregnating simultaneously with salts of all of several metals desired in the final electrode, the impregnation may be carried out by impregnating with the several salts successively and then precipitating and subjecting to cathodic treatment either after all of such impregnations or after each of such successive impregnations, washing being performed after each precipitation and cathodic treatment in either case. Thus, the support may be impregnated with one or more of the salts at a time until it has been impregnated with all desired salts and the remaining steps carried out either after all impregnation steps are completed or after each impregnating step. In each case, the sequence of steps may be repeated to insure deposition of sufficient active material in the support; and the order in which the respective salts are used in successive impregnation steps may be varied. The inclusion of a cadmium salt, or a mercury or inclusion salt may be optional. Furthermore, when the salts of more than one metal are used for impregnation, the acid radicals of the salts need not be identical. Additional modifications of the above-stated best form of the invention are that the precipitation with alkali metal hydroxide and the cathodic treatment may be performed at room temperature or at temperatures below the above-stated range of 60° C. to 80° C.; and the cathodic treatment may be omitted in respect of any or all of the metals introduced into or upon the electrode support.

It is to be observed that when the impregnation and precipitation steps are sequential and salts of mercury are included, a layer of mercury is ultimately formed between the layers of compounds of the other metals.

The proportion of iron salt and cadmium salt may be balanced or varied to produce desired electrical characteristics. For example, if it is desired to obtain the characteristics of a negative iron plate of an iron-nickel storage battery, the iron salt will predominate over the cadmium salt; and to obtain the characteristics of a negative cadmium plate of a cadmium-nickel alkaline storage battery predominance will be given to the cadmium salt. Generally, the proportion of auxiliary metal such as mercury or titanium with respect to the total of weight of deposited iron, cadmium and mercury or titanium will be less than 20%.

The activity of the metal powder used in the making of sintered metal powder supports is dependent upon the temperature at which the metal powder is produced by reduction of compounds thereof in an atmosphere of hydrogen. And, ordinarily a powder sufficiently inactive to resist decomposition of the support will result from reduction of the metal compound at temperatures below about 400° C. and above about 750° C.

The metal powders herein referred to are preferably extremely fine non-pyrophoric powders such as may be produced by decomposition of the carbonyls of the metals or reduction of compounds of the metals by heating other compounds thereof in an atmosphere of hydrogen.

In setting forth below examples of the procedure and product of this invention, examples of the best practices are given but it is to be understood that my invention is not limited to such examples and that procedures for the modified operations above-stated may be deduced from the examples. Thus, in the operation involving sequential impregnation and precipitation of different metals the proportions indicated for the simultaneous impregnations set forth in the examples may be used.

*Example I*

A porous metal plate, prepared by sintering of inactive metal powder, is immersed in a solution preferably at room temperature and containing cadmium chloride ($CdCl_2$), mercuric chloride ($HgCl_2$), and ferrous chloride ($FeCl_2$). The specific gravity of the impregnation bath is 55° Bé. The relative proportions of the metals contained in this solution are:

70% cadmium
10% mercury
20% iron

The pores of the porous plate are filled with this solution. The plate is then treated for thirty minutes with a bath of caustic soda of a specific gravity of 24° Bé. and at about 65° C. While in the caustic soda bath, it is subjected to cathodic electrical treatment. It is then washed and dried. These operations are repeated several times if necessary. Used as a negative electrode for an alkaline storage battery, the plate thus prepared has a capacity corresponding very nearly to that which can be obtained theoretically by virtue of the amounts of $Cd(OH)_2$ and $Fe(OH)_2$ introduced. After several hundred cycles of charge and discharge the capacity of the plate is almost undiminished.

*Example II*

Under conditions similar to those of Example I, a porous plate of sintered inactive metal powder is impregnated with an aqueous solution of $CdCl_2$, $TiCl_2$, and $FeCl_2$. The proportions of metals are:

80% cadmium
10% iron
10% titanium

These metals are then precipitated, as in Example I, by means of a soda solution and subjected to cathodic electrical treatment.

After several hundred cycles of charge and discharge the capacity of such a plate is still almost undiminished.

The procedure and product in accordance with this invention provide a battery electrode of high capacity and high efficiency that is long-lasting and durable and free of the deficiencies of prior procedures and electrodes.

Thus, in accordance with this invention, the support may carry the hydrate or oxide of titanium and also oxide or hydrate of iron or of cadmium or of both iron and cadmium, in any of such combinations it may also include mercury; or the electrode may be produced by impregnating the support with salts of the three metals, iron and cadmium and mercury, in which case it may also include titanium. The titanium acts to cause the electrode to retain its power capacity; and it causes iron to participate more actively in the electro-chemical exchange reactions and thereby makes it possible to use a reduced amount of expensive cadmium in cases in which cadmium is used in addition to iron.

What is claimed is:

1. An electrode for an electric battery having alkaline electrolyte comprising an electrolytically inactive electro-conductive support impregnated with precipitates consisting of ternary mixtures of hydroxides of iron, of cadmium and of a metal selected from the group consisting of mercury and titanium.

2. An electrode for an electric battery having alkaline electrolyte which comprises a support consisting essentially of a porous sintered electrolytically inactive metal powder selected from the group consisting of iron powder, nickel powder, and a metal powder consisting of a mixture of iron powder and nickel powder, within the porosity of which is deposited active precipitates consisting of ternary mixtures of hydroxides of iron, of cadmium, and of a metal selected from the group consisting of mercury and titanium.

3. An electrode for a battery having alkaline electrolyte comprising a porous conductive support carrying within its porosity electro-chemically active hydroxide of titanium and an electro-chemically active material selected from the group consisting of hydroxide of iron, hydroxide of cadmium, and a material consisting of both hydroxides of iron and a compound of cadmium.

4. An electrode for a battery having alkaline electrolyte comprising a porous conductive support carrying within its porosity electro-chemically active precipitates consisting of ternary mixtures of hydroxides of iron and cadmium, and mercury.

5. The method of forming an electrode for an electric battery having alkaline electrolyte which comprises the steps of impregnating an electrolytically inactive, electro-conductive support with a solution of water soluble salts selected from the group consisting of a salt of iron, a salt of cadmium, a salt of mercury, a salt of titanium, and mixtures of said salts, subjecting the impregnated support to precipitation treatment with a solution of an alkali metal hydroxide maintained at a temperature substantially within the range of 60° C. to 80° C., subjecting the impregnated support while in the solution of alkali metal hydroxide to cathodic electrical treatment, washing the so-treated support and repeating said steps to produce a substantial deposit containing the hydroxides of the metals of the selected salts of said group upon said support.

6. The method of claim 5, in which the solution of water soluble salts is a ternary mixture of iron, cadmium and mercury salts selected from said group of salts.

7. The method of forming an electrode for an electric battery having alkaline electrolyte which comprises the steps of impregnating in one stage an electrolytically inactive, electro-conductive support with a solution of a single water soluble salt selected from the group consisting of a salt of iron, a salt of cadmium and a salt of mercury, subjecting the impregnated support to precipitation treatment with a solution of an alkali metal hydroxide maintained at a temperature substantially within the range of 60° C. to 80° C., subjecting the impregnated support while in the solution of alkali metal hydroxide to cathodic electrical treatment, washing the so-treated support, further impregnating the support in another stage with a solution consisting of the other said salts of said group of salts, subjecting the impregnated support after impregnation in said last-named stage to treatment with a solution of an alkali metal hydroxide maintained at a temperature substantially within a range of 60° C. to 80° C., and while in the last-named solution to cathodic electrical treatment, washing the so-treated support and repeating said stages in any desired order and the steps sequential to each stage to produce a substantial deposit containing the hydroxides of the metals of the selected salts of said group upon said support.

8. The method of claim 5 in which the solution of water soluble salts is a ternary mixture of salts of iron, cadmium and titanium.

9. The method of claim 5 in which the solution of water soluble salts is a binary mixture of a salt of titanium and a salt of the group consisting of a salt of iron and a salt of cadmium.

VICTOR HEROLD.

References Cited in the file of this patent

UNITED STATES PATENTS

| Number | Name | Date |
| --- | --- | --- |
| 2,213,128 | Langguth | Aug. 27, 1940 |

FOREIGN PATENTS

| Number | Country | Date |
| --- | --- | --- |
| 143,327 | Great Britain | May 25, 1920 |
| 331,080 | Great Britain | June 26, 1930 |
| 331,540 | Great Britain | July 4, 1930 |
| 380,242 | Great Britain | Sept. 15, 1932 |
| 487,607 | Great Britain | June 23, 1938 |

OTHER REFERENCES

Fleischer: Transactions of the Electro-Chemical Society, vol. 94 (1948), pp. 289–294, The Electro Chemical Society Inc., New York, New York.